Nov. 4, 1969　　　J. E. ROBINSON　　　3,475,777
ANCHORAGE FOR SUSPENSION BRIDGE MAIN CABLE AND THE LIKE
Filed Sept. 22, 1967　　　　　　　　　　3 Sheets-Sheet 1
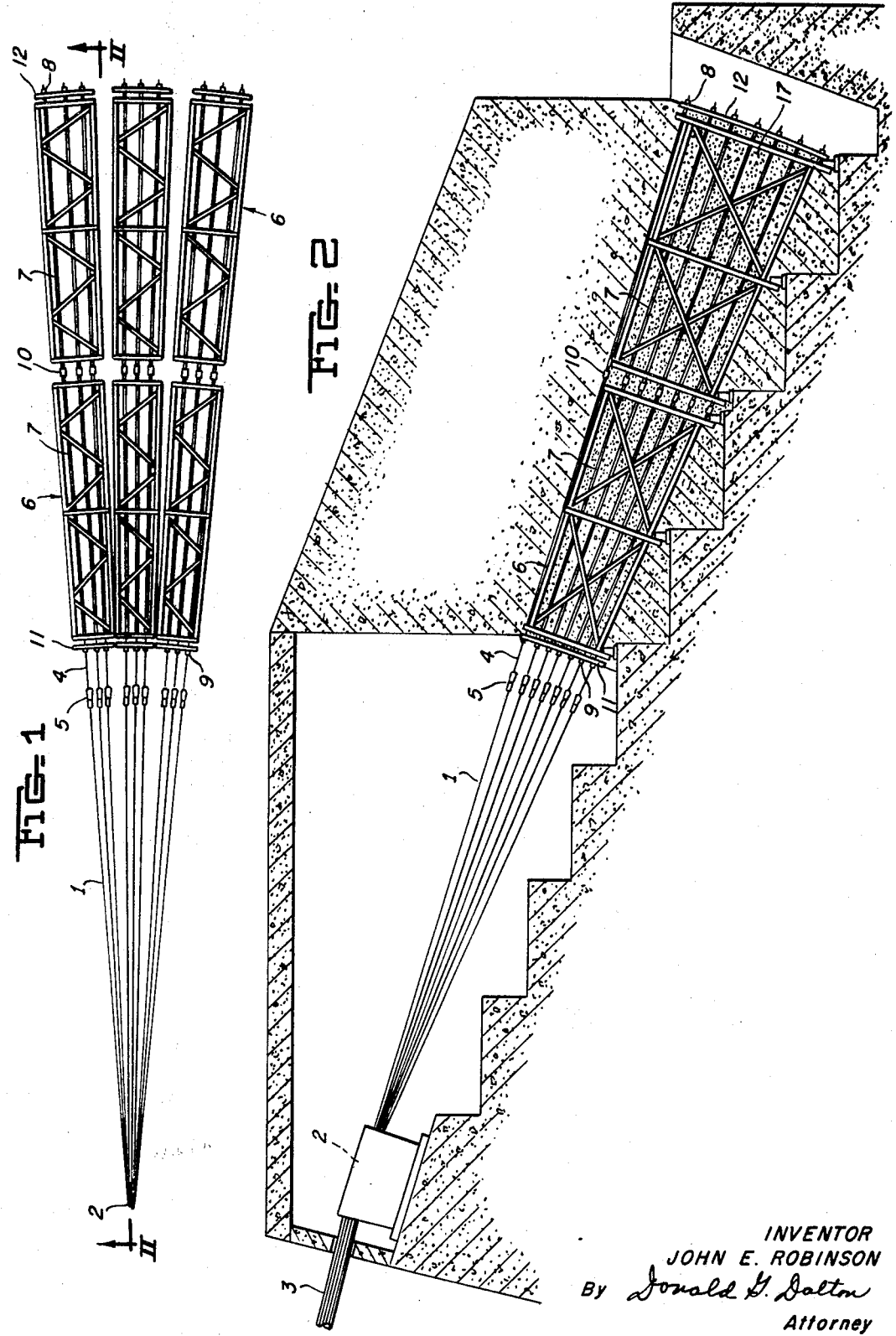
INVENTOR
JOHN E. ROBINSON
By Donald G. Dalton
Attorney

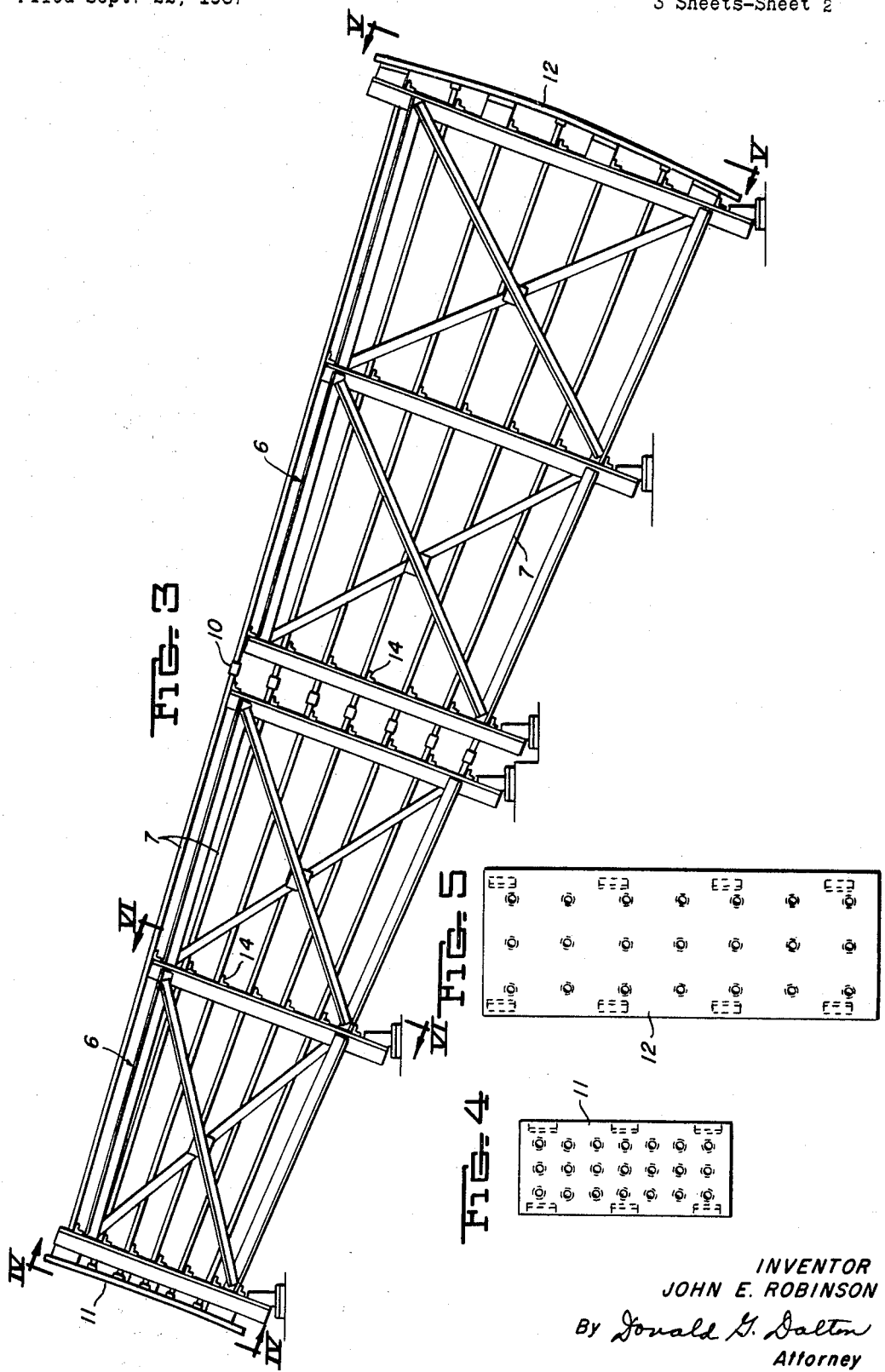

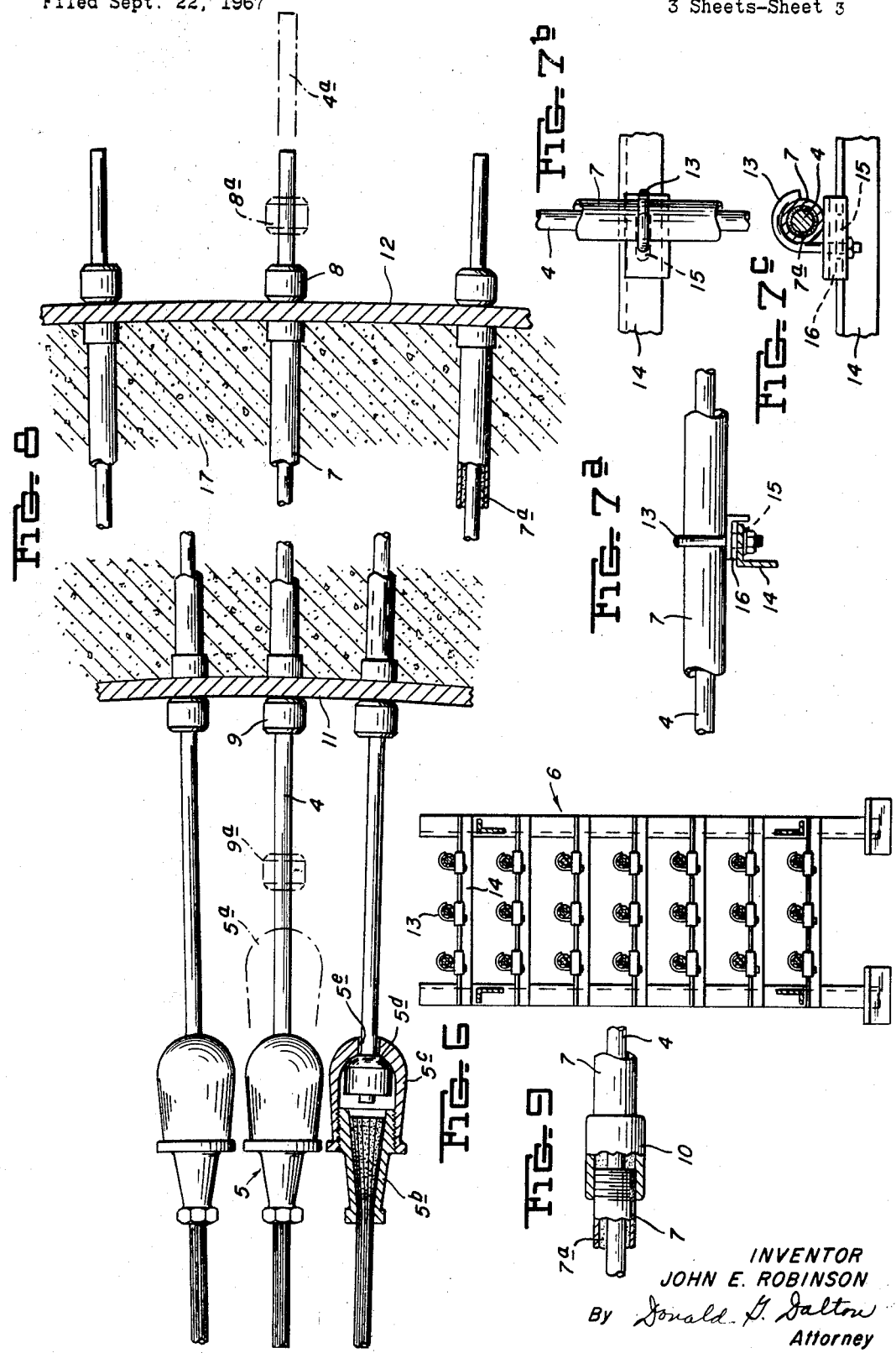

United States Patent Office 3,475,777
Patented Nov. 4, 1969

3,475,777
ANCHORAGE FOR SUSPENSION BRIDGE MAIN CABLE AND THE LIKE
John E. Robinson, Demarest, N.J., assignor to United States Steel Corporation, a corporation of Delaware
Filed Sept. 22, 1967, Ser. No. 669,746
Int. Cl. E01d 11/00
U.S. Cl. 14—21                 9 Claims

ABSTRACT OF THE DISCLOSURE

A method and apparatus for attaching the main tendons of suspended structures, such as suspension bridges and suspended roofs, to anchorage structures. In a typical application to a suspension bridge, a cage containing tubes, which are bore-sight aligned, from the rear, with the splay point of the main cable, is cast in a concrete anchorage. The tubes carry movable tension rods protruding from both ends, one end of each rod being flexibly attached to a tendon component of the cable. Each rod carries a nut at its front and rear face. Sag adjustment is made at the rear of the anchorage, between a rod and its nut bearing on the rear face of the pier. Post tensioning is accomplished by stretching the rods between their front and rear nuts.

Background of the invention

This invention relates primarily to aligned, adjustable, and prestressed anchoring of a general catenary-type suspension element, usually a steel tendon, composed of wires, in end anchorage structure of strand, or cable, typical applications being to conventional suspension bridges, self-anchored suspension bridges, tied arches, suspended roofs, or similar applications involving the use of relatively highly stressed tension members.

Anchorage piers or blocks are conventionally of concrete and it is known to take advantage of post tensioning thereof, to obtain prestressing. However, this takes the form of an entirely separate operation from the sag adjustment, wherein turnbuckles or other means are conventionally employed, in unrelated fashion.

Summary of the invention

The invention distinguishes over the prior art in that it provides a novel sag control system, which is preferably integrated with a system for post tensioning concrete piers and blocks, or other anchorage structures. Turnbuckles, or other sag adjustment means are not required, both sag adjustment and post tensioning being accomplished by manipulation of tension rods, extending through the anchorage structure, in conjunction with nuts positioned on the front and rear faces of the anchorage.

Means are provided for ready alignment of the tension bars with the splay or other near working point of the cable.

Means are provided for flexibly attaching a strand to its tension rod.

The invention therefore contemplates the provision of a simple, economical but efficient anchorage means utilizing comparatively few parts, and adapted to be quickly and easily assembled and adjusted in a simple step by step procedure to connect the strand to the tension member, to sag the strand, and then to post tension the tension member.

Brief description of the drawings

FIGURE 1 is a plan view of the multiple strand cable anchorage, with the surrounding concrete casting deleted.

FIGURE 2 is a vertical section taken along the line II—II of FIGURE 1.

FIGURE 3 is an enlarged view of the anchorage structure of FIGURE 2.

FIGURE 4 is a vertical end view of the frontal plate, taken along the line IV—IV of FIGURE 3.

FIGURE 5 is a vertical end view of the terminal plate, taken along the line V—V of FIGURE 3.

FIGURE 6 is a vertical section taken along the line VI—VI of FIGURE 3, showing one of the tube clamping and aligning frames.

FIGURE 7a is an enlarged detail of one of the clamps shown in FIGURE 6.

FIGURE 7b is a plan view of the clamp.

FIGURE 7c is a section through the tubing, showing the clamp.

FIGURE 8 is a detailed foreshortened view, partly in section, showing the attachment of the cables and the method for applying tension.

FIGURE 9 is an enlarged detail of the coupling used to connect forward and rearward sections of the anchorage structure.

Description of the preferred embodiment

FIGURES 1 and 2 show strands 1 divergingly emanating from splay point 2 of cable 3 (FIGURE 2). These strands are connected to rods 4 by connectors 5. The rods are supported in alignment with the splay point, or other working position of the strands, by means of supports in cage 6, which carry tubing 7, through which the rods pass. Nuts 8 at the rear secure the rods in position, for sag adjustment, and in conjunction with front nuts 9 permit post tensioning therebetween. Connectors 10 connect sections of tubing 7, in cases where it is convenient to assemble cage 6 in a plurality of sections. Preferably the connectors are threaded to only one tubing end 7, and provided with a sliding joint for the mating tube end, in order to simplify assembly. The jointed construction provided by connectors 10 also permits spacing and alignment of front and rear plates 11 and 12.

The tubes 7 are attached to front plate 11 of FIGURE 4 and rear plate 12 of FIGURE 5, which are preferably curved to conform to radii consistent with alignment with the splay point. The positions of plates 11 and 12 are shown in FIGURE 3.

FIGURE 6 is illustrative of a method of alignably attaching tubes 7 within cage 6, wherein J-bolts 13 secure the tubes to transverse members 14. FIGURE 7a provides somewhat more detail upon the clamping arrangement, which is further amplified by FIGURE 7b showing slot 15, which permits transverse adjustment of the tubes, and FIGURE 7c showing shims 16, which provide for adjustment at right angles thereto.

FIGURE 8 provides additional detail over FIGURES 1 and 2. Freedom of longitudinal movement of rods 4 is indicated by broken lines 4a, and the provisional position of nuts 8 and 9, during rod movement is similarly indicated by broken lines 8a and 9a. Broken lines 5a indicate possible connector position prior to adjustment of rod 4. Rods 4 are moveable in either direction, as required.

Also, FIGURE 8 depicts some details of a version of connector 5, wherein zinc socketing is shown at 5b, which is accompanied by shell 5c, having a hemispherical inner end surface which engages a nut 5d having a mating hemispherical surface. The hemispherical construction is to provide a knuckle-type flexibility between strand 1 and the usually more rigid rod 4, which works in conjunction with space 5e, between the rod and the hemispherical shell.

The cage 6 and tubes 7 lend themselves to prefabrication, away from the bridge site. The assembly is installed so that the tubes generally bore-sight upon the splay point, or similar working point of the cable, with final tube alignment being accomplished by means of the J-bolt 13 adjustment provisions. Plates 11 and 12 may be subdivided, so long as adequate bearing surface is preserved.

The provision for bore-sighting, by eye, obviates the need for employment of surveying instruments, and other more complicated and less direct methods, to achieve applicant's splay point alignment.

Upon completion of the tube alignment, they are embedded in concrete 17 (FIGURES 2 and 8).

Rods 4, or other suitable tension members, are then introduced into the tubes, extending beyond them at both ends. Connectors 5 are attached to the front ends of rods 4, conveniently after the rods have been placed in the tubes.

Once connection 5 is established it is not disturbed, and sag adjustment is accomplished by working the ends of the rods 4 protruding from the rear of the tubes, as by jacking, whereby lengthwise movement of the rods is obtained which is transmitted to connectors 5 to provide desired sag in the strands.

Post tensioning is accomplished by positioning nut 9 against front face plate 11 and continuing the jacking at the rear face. Nut 8 is then positioned against rear plate 12 to retain the tension thus produced. Grout 7a may be introduced between the rod and tube as shown in FIGURES 8 and 9, which is conventional in similar post tensioning operations.

In order to obviate the weakening effect of threads on rods 4, it is preferred that nuts 5d, 8 and 9 of FIGURE 8 take the form of Howlett grip nuts as typified by those shown in page 5 of catalogue No. SS–5, October 1963, of Stressteel Corporation, Wilkes-Barre, Pa., and in U.S. Patent No. 2,930,642, issued Mar. 29, 1960 to G. H. Howlett.

While the invention is especially advantageous in installations requiring a plurality of tubes and stress members, the principles thereof may be adapted to situations where anchorage of only a single suspension tendon is involved.

Also, it will be appreciated that stress members other than the aforementioned rods may be employed, and that other substitutions in details of construction and operation will occur to those skilled in the art to which the invention appertains, without departure from the scope of the invention as defined in the following claims.

I claim:
1. A method of end anchoring of catenary-type suspension elements, and components thereof, in anchorage structures, comprising:
 (a) providing at least one tube;
 (b) providing a support for said tube, said tube support comprising a cage having front and rear tube-supporting face plates and being fitted with adjustable means for tube alignment;
 (c) bore-sight aligning said tube with the near working point of the suspension element by eye sighting from the rear end of the tube;
 (d) embedding said tube and cage in concrete anchorage between said front and rear tube-supporting face plates;
 (e) inserting a stress member in said tube, with ends protruding from both the inner and outer tube end;
 (f) applying a nut to each end of said protruding stress member;
 (g) providing suitable means for attachment of the inner end of said stress member to the end of a suspension component, and effecting such attachment;
 (h) adjusting catenary sag of said suspension component by moving stress member longitudinally, operating at rear face, as by jacking;
 (i) retaining sag and positioning front nut against front face of front tube supporting face plate; and
 (j) resuming jacking until desired stress member tension is achieved and preserving tension by positioning rear nut against rear face of rear tube supporting face plate.

2. The method of claim 1 wherein in section (g) the said attachment means provide movable mating hemispherical surfaces between the unit attached to the said suspension component and a nut affixed to the end of said stress member.

3. The method of claim 1 wherein said cage provides supports for a plurality of tubes.

4. In a pier for anchoring a multiple-strand cable having a splay point from which the terminals of its strands diverge, a steel frame, a plurality of tubes mounted on said frame in bore-sight alignment with and converging on said splay point, there being one of said tubes for and in axial alignment with each of said terminals, front and rear bearing plates at opposite ends of said frame having openings therein in axial alignment with the bores of said tubes, tension rods mounted in said tubes with opposite ends thereof protruding through the said openings in said front and rear bearing plates, means connecting the front ends of said rods with said cable strand terminals, said rods being axially movable in said tubes to adjust the sag of said cable, gripping nuts on the front ends of said rods for engaging said front bearing plate to fix the sag adjustment of the cable strands to which they are connected, gripping nuts on the rear ends of said rods for engaging said rear bearing plates to tension said rods between the said nuts on the front and rear ends thereof, and a concrete block in which said frame and tubes are embedded, said front and rear bearing plates forming opposite faces of said pier, the tension on the said rods between said gripping nuts being effective through said bearing plates to post-tension said pier.

5. An anchoring pier as defined in claim 4 characterized by said steel frame including transversely extending members supporting said tubes, and adjustable means providing for movement of said tubes on said members to positions in bore-sight alignment with said cable splay point.

6. The invention defined in claim 5 characterized by said adjusting means including means for adjusting the positions of said tubes in vertical and horizontal directions relative to said transverse members.

7. In a pier for anchoring a multiple-strand cable having a splay point from which the terminals of its strands diverge, a steel frame, a plurality of tubes mounted on said frame, there being one of said tubes for each of said terminals and in axial alignment therewith, said steel frame comprising a plurality of transversely extending members on which said tubes are supported, adjustable means for fastening said tubes to said members and providing for adjustable movement thereon in vertical and horizontal directions relative to said supporting members to positions in bore-sight alignment with respect to said cable splay point, and a concrete block in which said frame and tubes are embedded.

8. An anchoring pier as defined in claim 4 characterized by each of said front and rear bearing plates having a plurality of said tension rod openings therein.

9. In a method of anchoring a multiple-strand cable having a splay point from which the terminals of its strands diverge, the steps which comprise providing a plurality of tubes in bore-sight alignment with and converging on said splay point, there being one of said tubes for each of said terminal strands, supporting said tubes in anchorage structure having front and rear faces through which said tubes open, said anchorage structure including poured concrete in which said tubes are embedded, inserting tension rods in each of said tubes with opposite ends thereof protruding beyond the said front and rear faces of said anchorage structure, connecting said stress rods with the said terminals of said cable strands, applying gripping nuts to the protruding ends of each of said stress rods, moving said stress rods in said tubes to adjust the sag of each of said cable strands, engaging the said nuts on the front ends of said stress rods with the front faces of said anchorage structure to fix the sag adjustment of said cable strands, and then applying tension to the portions of said rods in said tubes and engaging the gripping nuts on the rear ends of said rods with the rear faces of said anchorage structure to stress the concrete in said anchorage structure.

References Cited

UNITED STATES PATENTS

| | | | |
|---|---|---|---|
| 2,127,235 | 8/1938 | Robinson | 14—21 |
| 2,132,269 | 10/1938 | McHugh | 14—21 |
| 3,137,971 | 6/1964 | Rhodes | 52—230 |
| 3,225,500 | 12/1965 | Martter | 52—230 |
| 3,307,310 | 3/1967 | Kourkene | 52—230 |
| 3,387,417 | 6/1968 | Howlett | 52—223 |

FOREIGN PATENTS 906,940  3/1954  Germany.

JACOB L. NACKENOFF, Primary Examiner